(12) United States Patent
Hai et al.

(10) Patent No.: US 7,135,156 B2
(45) Date of Patent: Nov. 14, 2006

(54) METHOD FOR PROCESSING A ZIRCONIUM OXIDE COMPOSITION IN CRYSTALLINE FORM

(75) Inventors: Ton That Hai, Round Lake, IL (US); Mark Nordhaus, Antioch, IL (US); Paul Sanders, Greendale, WI (US); Cong Jiang, Gurnee, IL (US); Sujatha Karoor, Lake Bluff, IL (US)

(73) Assignees: Baxter International Inc., Deerfield, IL (US); Baxter Healthcare S.A., Wallisellen (CH)

( * ) Notice: Subject to any disclaimer, the term of this patent is extended or adjusted under 35 U.S.C. 154(b) by 483 days.

(21) Appl. No.: 10/402,105

(22) Filed: Mar. 28, 2003

(65) Prior Publication Data

US 2004/0191162 A1    Sep. 30, 2004

(51) Int. Cl.
*C01G 1/00*         (2006.01)
*C01G 25/00*        (2006.01)

(52) U.S. Cl. ................. 423/69; 423/81; 423/84; 423/85; 423/608

(58) Field of Classification Search ............ 423/69, 423/85, 608, 84, 81; 252/184; 210/321.71, 210/645, 646
See application file for complete search history.

(56) References Cited

U.S. PATENT DOCUMENTS

| | | | |
|---|---|---|---|
| 3,850,835 A | | 11/1974 | Marantz et al. |
| 4,071,444 A | * | 1/1978 | Ash et al. ............. 210/637 |
| 4,719,091 A | * | 1/1988 | Wusirika ............. 423/82 |
| 4,784,794 A | * | 11/1988 | Kato ............. 516/90 |
| 4,929,381 A | * | 5/1990 | Clark ............. 510/508 |
| 4,933,154 A | * | 6/1990 | Kwon ............. 423/69 |
| 4,971,729 A | * | 11/1990 | White ............. 252/625 |
| 5,149,510 A | * | 9/1992 | Recasens et al. ............. 423/84 |
| 5,188,991 A | * | 2/1993 | Kriechbaum et al. ............. 501/103 |
| 5,976,401 A | * | 11/1999 | Suzuki et al. ............. 252/179 |
| 6,034,029 A | * | 3/2000 | Wulff-Doring et al. ............. 502/308 |
| 2005/0194304 A1 | * | 9/2005 | Paolis ............. 210/321.71 |

OTHER PUBLICATIONS

U.S. Appl. No. 09/990,673, filed Nov. 13, 2001, Karoor et al.
Clearfield, A., 1990, The mechanism of hydrolytic polymerization of zirconyl solutions, *J. Mater. Res.*, 5(1), 161-162.
Srinivasan, R., De Angelis, R., David, B. H., 1986, Factors influencing the stability of the tetragonal form of zirconia, *J. Mater. Res.*, 1(4), 583-588.
Srinivasan, R., Harris, M. B., Simpson, S.F., De Angelis, R., David, B. H., 1988, Zirconium oxide crystal phase: The role of the pH and time to attain the final pH for precipitation of the hydrous oxide, *J. Mater. Res.*, 3(4), 787-789.
Davis, B. H., 1984, Effect of pH on crystal phase of $ZrO_2$ precipitated from solution and calcined at 600° C., *J. Am. Ceram. Soc.*, 67, C-168.
Mercera, P. D. L., Van Ommen, J. G., Doesburg, E. B. M., Burggraaf, A. J., Ross, J. R. H., 1990, Zirconia as a support for catalysts. Evolution of the texture and structure on calcination in air, *Appl. Catal.*, 57, 127-148.
Moon, Y. T., Kim, D. K., Kim, C. H., 1995, Preparation of monodisperse $ZrO_2$ by the microwave heating of zyrconyl chloride solutions, *J. Am. Ceram. Soc.*, 84(4), 1103-1106.
Hu, M. Z. C., Hunt, R. D., Payzant, E. A., Hubbard, C. R., 1999, Nanocrystallization and phase transformation in monodispersed ultrafine zirconia particles from various homogeneous precipitation methods, *J. Am. Ceram. Soc.*, 82(9), 2313-2320.
Hu, M. Z. C., Payzant, E. A., Byers, C. H., 2000, Sol-Gel and ultrafine particle formation via dielectric tuning of inorganic salt-alcohol-water solutions, *J. Colloid Interface Sci.*, 222, 20-36.
Park. H. K., Kim, D. K., Kim, C. H., 1977, Effect of solvent on titania particle formation and morphology in thermal hydrolysis of $TiCl_4$. *J. Am. Ceram. Soc.*, 80, 743-749.
Mercera, P. D. L., Van Ommen, J. G., Doesburg, E. B. M., Burggraaf, A. J., Ross, J. R. H., 1992, Influence of ethanol washing of the hydrous precursor on the textural and the structural properties of zirconia, *J. Mater. Sci.*, 27, 4890-4898.
Jones, S. L., Norman, C. J., 1988, Dehydration of hydrous zirconia with methanol. *J. Am. Ceram. Soc.*, 71(4), C-190-C191.

* cited by examiner

*Primary Examiner*—Timothy C. Vanoy
(74) *Attorney, Agent, or Firm*—Joseph P. Reagen; Bell, Boyd & Lloyd LLC (57) ABSTRACT

Methods of producing zirconium oxide compositions and using same are provided. The zirconium oxide compositions in crystalline form can be prepared by a synthetic process wherein the hydrolysis of zirconyl chloride and particle formation can be achieved simultaneously. Alternatively, the particle formation can occur first and then followed by hydrolysis with a base solution. The processes utilize a zirconyl salt solution that includes a zirconyl salt in isopropanol and water.

30 Claims, 2 Drawing Sheets

METHOD FOR PROCESSING A ZIRCONIUM OXIDE COMPOSITION IN CRYSTALLINE FORM

BACKGROUND OF THE INVENTION

The present invention relates generally to zirconium oxide compositions. More specifically, the present invention relates to methods of making and using zirconium oxide compositions in crystalline form that have an effective sorption capacity, such as for phosphates.

In general, materials are known and used to remove constituents from fluids for a number of different applications including, for example, industrial, recreational, therapeutic, diagnostic and/or the like. For example, cationic polymers, anionic polymers and combinations thereof are typically used to purify a variety of different aqueous streams, such as industrial process streams, via ion exchange, flocculation or other suitable mechanism. Other materials are generally known as sorbent materials. The physiochemical properties of these types of materials enable them to remove suitable types of constituents from fluid via adsorption, absorbtion, chemisorption, chemical binding and/or other suitable mechanisms.

In general, materials are known in the art that are capable of removing phosphorous-containing constituents in solution. For example, zirconium oxide materials have been made by hydrolysis of a zirconium salt with a base. With these methods, the zirconium oxide is produced in a gel form. This can make it difficult to purify, such as by washing with water using a redispersion and decantation method.

Zirconium oxides, in general, have been made in crystalline or granular form. For example, particle formation is known to result from adding a low dielectric medium to an aqueous solution of zirconium salt. In this regard, monodispersed, submicron and nanoscale (e.g., <100 nm) zirconium oxide microspheres or powders have been synthesized under conditions that employ a 5:1 volume ratio of 2-propanol:water using hydroxypropyl cellulose and ammonia neutralization.

This synthetic method can be problematic. For example, the particle size of the zirconium oxide material is very fine in size, such as less than 100 nanometers (nm) as previously discussed. Further, the zirconium oxide displays a substantially low phosphate sorption capacity.

A need, therefore, exists to provide zirconium oxide compositions made from improved methods with sorption properties that can be effective even under physiological conditions and that can be readily and easily made at reduced costs, and easily adapted to existing systems, such as therapeutic systems.

SUMMARY OF THE INVENTION

The present invention relates to zirconium oxide compositions. In particular, the present invention relates to improved methods of making and using zirconium oxide compositions in crystalline or granular form that display effective sorption capacity, particularly with respect to phosphorous-containing constituents, such as phosphate ions.

In an embodiment, the zirconium oxide compositions are produced by preparing a reaction solution that includes a base solution and a zirconyl salt solution wherein the zirconyl salt solution includes a zirconyl salt in isopropanol and water. The reaction solution is mixed and heated at a reflux temperature, thereby forming a zirconium oxide precipitate. The precipitate can then be washed, dried and further processed prior to use.

In another embodiment, the zirconium oxide compositions are produced by preparing a zirconyl salt solution that includes a zirconyl salt in isopropanol and water. The zirconyl salt solution is heated at a reflux temperature. A base solution is added to the zirconyl salt solution at the reflux temperature, thereby forming a zirconium oxide precipitate. The precipitate can then be washed, dried and further processed prior to use.

As previously discussed, zirconium oxide compositions made pursuant to an embodiment of the present invention can display an effective sorption capacity, particularly with respect to phosphorous-containing constituents. This can be particularly beneficial as applied during regenerative dialysis therapy where the dialysate is regenerated prior to reuse, such as recirculation into, through and out of a patient's peritoneal cavity during continuous flow peritoneal dialysis. In this regard, the zirconium oxide compositions of the present invention can be adapted in any suitable way to remove at least a portion of phosphate ions, other suitable metabolic waste, suitable other biological matter and the like from the dialysate prior to reuse. It should be appreciated that the zirconium oxide compositions of the present invention can be utilized in a variety of different and suitable applications with respect to and in addition to dialysis therapy.

Further, the zirconium oxide compositions made pursuant to an embodiment of the present invention have a large particle size. This allows the composition to be readily purified, such as by washing with water and/or other suitable purification techniques.

In yet another embodiment, the present invention provides a method of increasing sorption capacity of a zirconium oxide composition in crystalline form made pursuant to an embodiment of the present invention.

An advantage of the present invention is to provide improved methods for making zirconium oxide compositions.

Another advantage of the present invention is to provide improved materials, devices, apparatuses and systems that utilize zirconium oxide compositions made according to an embodiment of the present invention.

Yet another advantage of the present invention is to provide improved zirconium oxide compositions in crystalline form that display an enhanced sorption capacity for phosphorous-containing constituents and/or the like.

Yet still another advantage of the present invention is to provide improved zirconium oxide compositions in crystalline form that can bind phosphorous-containing constituents and/or the like under physiological conditions.

A still further advantage of the present invention is to provide zirconium oxide compositions that can be made pursuant to an embodiment of the present invention with relative ease, at reduced costs and high yields.

A further advantage of the present invention is to provide improved zirconium oxide compositions that can remove phosphates and/or the like from solutions used during medical therapy, such as dialysis.

Additional features and advantages of the present invention are described in, and will be apparent from, the following Detailed Description of the Invention and the figures.

DETAILED DESCRIPTION OF THE INVENTION

The present invention generally relates to zirconium oxide compositions. More specifically, the present invention relates to methods of making and using zirconium oxide compositions that display an effective sorption capacity for phosphorous-containing constituents.

In general, the processes of the present invention provide a crystalline or granular form of zirconium oxide that are relatively easy and inexpensive to make. In crystalline form, the zirconium oxide can be readily purified. In this regard, the zirconium oxide crystals or granulated particles have a large particle size. In an embodiment, the particle size is greater than about 10 microns.

As previously discussed, the zirconium oxide compositions display enhanced sorption capacity, particularly with respect to phosphate-containing constituents, such as anions, molecules or radicals containing heteroatoms with free electron pairs including phosphorous, such as phosphates. In an embodiment, the zirconium oxide compositions display a sorption capacity of greater than about 20 milligrams (mg) of phosphorous/gram (g) of zirconium oxide. Preferably, the zirconium oxide compositions have a sorption capacity that ranges from about 27 mg to at least about 29 mg of phosphorous per gram of zirconium oxide composition. This makes the zirconium oxide compositions made pursuant to an embodiment of the present invention useful for a variety of different applications, particularly with respect to therapeutic therapies, such as dialysis therapy as described below.

With respect to dialysis therapy, the present invention can be used in a variety of different dialysis therapies to treat kidney failure. Dialysis therapy as the term or like terms are used throughout the text is meant to include and encompass any and all forms of therapies to remove waste, toxins and excess water from the patient. The hemo therapies, such as hemodialysis, hemofiltration and hemodiafiltration, include both intermittent therapies and continuous therapies used for continuous renal replacement therapy (CRRT). The continuous therapies include, for example, slow continuous ultrafiltration (SCUF), continuous venovenous hemofiltration (CVVH), continuous venovenous hemodialysis (CVVHD), continuous venovenous hemodiafiltration (CVVHDF), continuous arteriovenous hemofiltration (CAVH), continuous arteriovenous hemodialysis (CAVHD), continuous arteriovenous hemodiafiltration (CAVHDF), continuous ultrafiltration periodic intermittent hemodialysis or the like. The present invention can also be used during peritoneal dialysis including, for example, continuous ambulatory peritoneal dialysis, automated peritoneal dialysis, continuous flow peritoneal dialysis and the like. However, it should be appreciated that the compositions of the present invention can be effectively utilized with a variety of different applications, physiologic and non-physiologic, in addition to dialysis.

As previously discussed, the present invention generally provides methods of making zirconium oxide compositions in crystalline or granular form with a sorption capacity effective for use in a number of different applications, particularly as applied to dialysis therapy. For example, the zirconium oxide compositions can be prepared by a synthetic process wherein the hydrolysis of zirconyl chloride and particle formation can be achieved simultaneously as described below. Alternatively, the particle formation can be achieved first and then followed by hydrolysis with a base solution.

In an embodiment, a method of producing a zirconium oxide material includes preparing a reaction solution that includes a base solution and a zirconyl salt solution wherein the zirconyl salt solution includes a zirconyl salt in isopropanol and water. The reaction solution is mixed and then heated at a reflux temperature, thereby forming a zirconium oxide precipitate. The precipitate can be washed, dried and further processed for use.

In another embodiment, the zirconium oxide compositions can be prepared as follows. In an initial step, a zirconyl salt solution is prepared that includes a zirconyl salt in isopropanol and water. The solution is then heated to a reflux temperature and a base solution is added to the solution at the reflux temperature, thereby forming the zirconium oxide precipitate. The precipitate can then be washed, dried and further processed prior to use.

It should be appreciated that the synthetic processes of the present invention can be carried out in any suitable manner. For example, the reaction solution can be prepared with any suitable type and amount of zirconyl salt, base solution and other suitable reaction components. In an embodiment, the zirconyl salt includes a zirconyl chloride octahydrate or other suitable zirconium-containing compound; and the base solution includes a base material, such sodium hydroxide, ammonium hydroxide, combinations thereof and the like. The base solution can include any suitable concentration, preferably about 10 Normal (N). The zirconyl salt solution can be made from any suitable amount of isopropanol and water. In an embodiment, the volume ratio of isopropanol to water in the zirconyl salt solution ranges from about 5:1 to about 2:1.

The reaction solution can be processed at any suitable temperature over any sufficient period of time. In an embodiment, the reaction solution that includes a base solution and a zirconyl salt solution is first mixed at room temperature for about 2 hours to about 20 hours, thereby forming a white precipitate. Preferably, the base solution is added slowly to a stirred zirconyl salt solution. Next, the reaction solution is heated to a reflux temperature and maintained at the reflux temperature for about 2 hours to about 20 hours, after which time a heavy white zirconium oxide precipitate is formed.

The white precipitate is isolated by decantation and washed in a solvent, such as water, ethanol, combinations thereof or the like. For example, the precipitate can be isolated by decantation, washed solely with water or with water followed by ethanol using redispersion in water, ethanol or the like, and decantation methods. After washing, the precipitate is dried at a suitable temperature, such as about 80° C. to about 110° C. In an embodiment, the precipitate is dried over an extended period, such as overnight.

In another embodiment, the zirconyl salt solution is heated to reflux for about 1 hour to about 6 hours to induce particle formation. The base solution is then added to the zirconyl salt solution, and the mixture is heated to reflux and maintained for about 1.5 hours to about 20 hours to complete hydrolysis, thus yielding a heavy white precipitate.

The precipitate is isolated by decantation and washed in a solvent, such as water, ethanol, combinations thereof or the like, and optionally adjusted to a desired pH and is again washed. In an embodiment, the precipitate is finally washed with water alone or washed with water followed with ethanol using redispersion and decantation methods. After washing, the precipitate is dried at a suitable temperature overnight, such as about 60° C. to about 110° C. In an embodiment, the precipitate is dried for a lengthened period, such as overnight.

By way of example and not limitation, the following examples are illustrative of how to make the zirconium oxide compositions according to an embodiment of the present invention and further illustrate experimental tests conducted on zirconium oxide compositions made in accordance with an embodiment of the present invention.

Synthesis of Zirconium Oxide (ZO)

The zirconium oxide compositions were, in general, made according to two types of synthetic procedures (Methods I and II). Under the Method I procedure, the hydrolysis of zirconyl chloride and particle formation essentially occurred at the same time according to an embodiment of the present invention as previously discussed. Under the Method II procedure, the particle formation occurred first and was followed by hydrolysis according to another embodiment of the present invention as previously discussed.

Method I—ZO Composition One

Step 1: Isopropanol (156.4 mL) was added to a stirred solution of zirconyl chloride octahydrate (64.45 g, 200 mmol) in water (35 mL) to give a turbid solution. To this solution, while stirring, 10 N NaOH (43.2 mL, 432 mmol) was added dropwise over 15 minutes and then stirred at room temperature for 2 hours. Stirring was stopped, and the precipitate was allowed to settle.

Step 2: The supernatant (170 mL) was discarded by decantation, and isopropyl alcohol (150 mL) was added. The mixture was stirred and heated to reflux for 20 hours.

Step 3: After refluxing, the reaction mixture was cooled to room temperature and the supernatant was removed by decantation. The precipitate was washed by repeated cycles of redispersion in water (500 mL) and decantation. Washing was continued until the conductivity of the supernatant reached 460 µS/cm (9 cycles). The precipitate was isolated by filtration. The wet precipitate was divided into two equal portions. A first portion was dried at 110° C. overnight to give a product (11.13 g). A second portion was washed with ethanol (300 mL) by redispersion and decantation method. Washing was continued for two cycles, and the product was isolated by filtration and dried at 80° C. overnight to give another product (10.27 g).

Method I—ZO Composition Two

Step 1: Isopropyl alcohol (312.8 mL) was added to a stirred solution of zirconyl chloride octahydrate (128.9 g, 400 mmol) in water (70 mL) to give a turbid solution. Sodium hydroxide (10 N, 86.4 mL, 864 mmol) was added dropwise over 15 minutes to give a white precipitate. The mixture was stirred at room temperature for 2 hours.

Step 2: The stirred reaction mixture was heated to reflux for 20 hours and then cooled to room temperature, and the precipitate was allowed to settle.

Step 3: The supernatant was discarded, and the precipitate was washed by repeated cycles of redispersion in water (500 mL) and decantation. Washing was continued until the conductivity of the supernatant reached 650 µS/cm (7 cycles). The precipitate was then stirred with water (500 mL), and the pH of the mixture was adjusted to 7.0 using 1N HCl (24 mL). After pH adjustment, the mixture was allowed to settle down, and the clear supernatant was discarded by decantation. The precipitate was washed by repeated cycles of redispersion in water (1 L) and decantation. Washing was continued until the conductivity of the supernatant reached 11.6 µS/cm (3 cycles). The wet precipitate was divided into two equal portions. A first portion was dried at 80° C. overnight to give one product (16.74 g). A second portion was dried at 110° C. overnight to give another product (15.18 g).

Method II—ZO Composition Three

Step 1: Isopropyl alcohol (280 mL) was added to a stirred solution of zirconyl chloride octahydrate (128.9 g, 400 mmol) in water (70 mL) to give a turbid solution. The solution was heated to reflux for 2 hours to produce a white precipitate.

Step 2: Heating was stopped and 10N NaOH (86.4 mL, 864 mmol) was added dropwise while stirring over 10 minutes. After NaOH addition, heating to reflux was resumed.

Step 3: After refluxing for 20 hours, the reaction mixture was cooled to room temperature and the supernatant was discarded by decantation. The precipitate was washed by repeated cycles of redispersion in water (1 L) and decantation. A small amount of fine materials formed in the reaction mixture was eliminated by the decantation method. Washing was continued until the conductivity and the pH of the supernatant reached 593 µS/cm and 10.5, respectively. The wet precipitate, which was isolated by vacuum filtration, was divided into four equal portions. A first portion was dried at 110° C. overnight to give one product (11.49 g). A second portion was dried at 80° C. overnight to give another product (11.86 g).

Third and fourth portions were combined, stirred with water (450 mL), and the pH of the mixture was adjusted to 7.0 with 1N HCl (13 mL). After pH adjustment, the precipitate was washed by repeated cycles of redispersion in water (500 mL) and decantation. The supernatant of the last wash cycle (3) had a pH of 7.0 and conductivity of 12.8 µS/cm. The wet precipitate was divided into two equal portions. A portion was dried at 110° C. overnight to give one product (10.6 g). Another portion was washed with ethanol (300 mL) by redispersion and decantation methods (2 cycles). The precipitate was dried at 80° C. overnight to give another product (11.09 g).

Method II—ZO Composition Four

Step 1: Isopropyl alcohol (210 mL) was added to a stirred solution of zirconyl chloride octahydrate (128.9 g, 400 mmol) in water (70 mL) to give a turbid solution. The solution was heated to reflux for 2 hours to give a white precipitate.

Step 2: Heating was stopped and 10 N NaOH (86.4 mL, 864 mmol) was added to the stirred reaction mixture over 20 minutes. Heating to reflux was resumed.

Step 3: After refluxing for 20 hours, the reaction mixture was cooled to room temperature, and the solid was allowed to settle. The supernatant was discarded, and the precipitate was washed by repeated cycles of redispersion in water (500 mL) and decantation, until the conductivity and pH of the supernatant reached 1.7 µS/cm and 11.5, respectively (7 cycles). After washing, the pH of the precipitate in water (500 mL) was adjusted to 7.0 with 1N HCl (42 mL). The supernatant was discarded by decantation and the precipitate was washed by repeated cycles of redispersion and decantation (3 cycles). The wet precipitate was divided into four equal portions. Portion one was dried under house vacuum filtration overnight to give one product (14.11 g). Portion two was dried at 60° C. overnight to give a second product (11.95 g). Portion three was dried at 80° C. overnight to give a third product (12.16 g). Portion four was dried at 110° C. overnight to give a fourth product (10.95 g).

Method II—ZO Composition Five

Step 1: Isopropyl alcohol (5.25 L) was added to a stirred solution of zirconyl chloride octahydrate (3.2 kg, 10 mol) in water (1.75 L) to give a turbid solution. The solution was heated to reflux for 2 hours to give a white precipitate.

Step 2: Heating was stopped, and 10 N NaOH (2.16 L, 21.6 mol) was added to the stirred reaction mixture over 20 minutes. Heating to reflux was resumed.

Step 3: After refluxing for 20 hours, the reaction mixture was cooled to room temperature and the solid allowed to settle. The supernatant was discarded, and the precipitate was washed by repeated cycles of redispersion in water (15 L) and decantation until the conductivity and pH of the supernatant reached 2.3 μS/cm and 11.5, respectively (9 cycles). After washing, the pH of the precipitate in water (15 L) was adjusted to 7.2 with 5N HCl (187 mL). The supernatant was discarded by decantation, and the precipitate was washed by repeated cycles of redispersion (6 L) and decantation (5 cycles). The precipitate was collected via vacuum filtration over a Whatman #54 paper and vacuumed until no more fluid passed through the Buchner funnel. The filter cake was then transferred to a drying pan and dried at 110° C. overnight (approximately 15 hours) to give a product (902 g).

Phosphorous Sorption Capacity Experiments

Zirconium oxide compositions made according to an embodiment of the present invention as previously discussed were subjected to a dynamic test system for determination of phosphorous sorption capacity. The experimental procedures and results are detailed below.

In general, a column was packed with a zirconium oxide composition test sample and a mobile phase was passed through the column. Mobile phase fractions were collected at various time periods and analyzed for pH, phosphorous and other analytes.

In particular, a BIORAD BIO-SCALE column (MT2, Cat. No. 751-0081) was packed with the zirconium oxide test sample according to known procedures. The mobile phase included a BAXTER DIANEAL PD-1 solution that was spiked with sodium phosphate ($NaH_2PO_4$: SIGMA, Cat. No. S-8282) to a level of 3 mg/dL of phosphorous. The mobile phase was pumped (pump: APPLIED BIOSYSTEMS, MODEL 400 SOLVENT DELIVERY SYSTEM) through the column at 2 mL/min over a period of 460 minutes.

Fractions (4 mL) were collected at various time intervals (minutes) as follows: 0, 2, 4, 6, 8, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, and 460. The collected fractions were then analyzed for calcium (Ca), phosphorous (P), magnesium (Mg), sodium (Na), and pH using the following clinical chemistry analyzers: 1) Ca: ROCHE, BOEHRINGER MANNHEIM, Cat. No. 1489216, COLORIMETRIC METHOD, INSTRUMENT HITACHI 911; 2) P: ROCHE, BOEHRINGER MANNHEIM, Cat. No. 1040898, AMMONIUM PHOSPHOMOLYBDATE METHOD, INSTRUMENT HITACHI 911; 3) Mg: ROCHE, BOEHRINGER MANNHEIM, Cat. No. 1489330, COLORIMETRIC METHOD, INSTRUMENT HITACHI 911; 4) Na: ROCHE, BOEHRINGER MANNHEIM, Cat. No. 371037, ISE TECHNOLOGY, INSTRUMENT HITACHI 911; and 5) pH: ORION pH meter.

The phosphorous capacity was calculated as follows:

$$\frac{[P](mg/dL)_{Feed} \cdot \text{Flow Rate}(mL/min) \cdot B.T.(min) \cdot 0.01}{ZO\ (g)} = \text{Capacity (mg/g)}$$

where $[P]$ $(mg/dL)_{Feed}$ is the phosphorous concentration in the mobile phase, Flow Rate (mL/min) is the rate at which the mobile phase is pumped, B.T. (min) is the last time point (fraction) at which the phosphorous concentration is less than or equal to 10% of the phosphorous feed concentration (i.e., 0.6 mg/dL), and ZO is the weight of zirconium oxide packed in the column.

The capacity results are indicated below in Tables I and II. Table I represents phosphorous capacity tests conducted on zirconium oxide compositions made pursuant to Method I according to an embodiment of the present invention as previously discussed. Table II represents phosphorous capacity tests conducted on zirconium oxide compositions made pursuant to Method II according to an embodiment of the present invention as previously discussed.

TABLE I

METHOD I[a]

| | | Step 1 | | | | | Step 2 | Step 3 | | Phosphorous | |
|---|---|---|---|---|---|---|---|---|---|---|---|
| ZO Product | $ZrOCl_2$g (mmol) | Water (mL) | IPA (mL) | 10 N NaOH (mL) | IPA/ Water | Temp.° C./ Time, hr.[b] | Temp.° C./ Time, hr.[c] | Washing, pH adj., and drying[d] | Yield (g)[i] | Cap. (mg P/g ZO) | Density (g/mL) |
| ZO-A1 | 32.225 (100) | 20 | 315 | 43.2 (5 N) | 5/1 | RT/2 | Reflux/2 | E-B80 | 11.6 | >29.1 | 0.677 |
| ZO-A2 | 32.225 (100) | 18 | 183 | 21.6 | 4.6/1 | RT/1.25 | Reflux/3 | E-B80 | 12.2 | — | 0.697 |
| ZO-A3 | 32.225 (100) | 18 | 183 | 21.6 | 4.6/1 | RT/20 | — | E-B80 | 10.1[e] | 7.5 | 0.823 |
| ZO-A4 | 32.225 (100) | 18 | 158 | 21.6 | 4/1 | RT/2 | Reflux/3 | E-B80 | 11.8[e] | 23.9 | 0.830 |
| ZO-A5 | 64.45 (200) | 36 | 238 | 43.2 | 3/1 | RT/2 | Reflux/3 | E-B80 | 16.5[f] | >29.1 | 0.574 |
| ZO-A6 | 64.45 (200) | 36 | 158 | 43.2 | 2/1 | RT/2 | Reflux/3[g] | E-B80 | 17.2[f] | >28.4 | 0.515 |

TABLE I-continued

METHOD I[a]

| ZO Product | ZrOCl₂ g (mmol) | Water (mL) | IPA (mL) | 10 N NaOH (mL) | IPA/ Water | Step 1 Temp.° C./ Time, hr.[b] | Step 2 Temp.° C./ Time, hr.[c] | Step 3 Washing, pH adj., and drying[d] | Yield (g)[i] | Phosphorous Cap. (mg P/g ZO) | Density (g/mL) |
|---|---|---|---|---|---|---|---|---|---|---|---|
| ZO-A7 | 64.45 (200) | 45 | 88.2 | 43.2 | 1/1 | RT/2 | Reflux/3[g] | E-B80 | 8.2[f] | >28.7 | 0.422 |
|  |  |  |  |  |  |  |  | W-B110 | 11.0 | 27.0 | 0.719 |
| ZO-A8 | 64.45 (200) | 45 | 88.2 | 43.2 | 1/1 | RT/2 | Reflux/3[h] | E-B60 | 11.8 | >28.3 | 0.533 |
|  |  |  |  |  |  |  |  | W-B110 | 9.8 | 24.4 | 0.937 |
| ZO-A9 | 64.45 (200) | 35 | 156 | 43.2 | 2/1 | RT/2 | Reflux 3[h] | E-B60 | 9.7 | 39.3 | 0.718 |
|  |  |  |  |  |  |  |  | W-B110 | 8.9 | 16.5 | 1.039 |
| ZO-A10 | 64.45 (200) | 35 | 156 | 43.2 | 2/1 | RT/2 | Reflux/20[h] | E-B60 | 11.1 | 39.3 | 0.570 |
|  |  |  |  |  |  |  |  | W-B110 | 10.3 | 26.8 | 0.836 |
| ZO-A11 | 128.9 (400) | 70 | 313 | 86.4 | 2/1 | RT/2 | Reflux/20 | W-N80 | 16.7 | 23.3 | 0.807 |
|  |  |  |  |  |  |  |  | W-N110 | 16.2 | 26.8 | — |

[a]Step 1: NaOH (10 N) was added slowly (over 15 min) to a stirred solution of zirconyl chloride octahydrate in isopropanol (IPA)-Water to produce a white precipitate. The mixture was stirred at RT for 1–20 hrs. Step 2: The mixture was heated to reflux for 2–3 hrs. and then stirred at RT overnight for 20 hrs. Alternatively, IPA-water was discarded and replaced with water before heating to reflux.
[b]RT: Room temperature.
[c]After refluxing (2–3 hrs.), the reaction mixture was stirred at RT overnight.
[d]Nomenclature Examples: E-B80: Product was washed with water followed by ethanol (E), no pH adjustment (B), dried at 80° C. (80); W-B110: Product was washed with water (W), no pH adjustment (B), dried at 110° C.(110); W-N110: Product was washed with water (W), pH was adjusted to 7 (N), dried at 110° C. (110); and E-B60: Product was washed with water followed by ethanol (E), no pH adjustment (B), dried at 60° C. (60).
[e]Fines were partially removed during washing by decantation of the supernatant.
[f]Fines were completely removed during washing by decantation of the supernatant.
[g]Supernatant was replaced by water.

TABLE II

METHOD II[a]

| ZO Product | ZrOCl₂ g (mmol) | Water (mL) | IPA (mL) | Step 1 IPA/ Water (v/v) | Temp./ Time, hr. | Step 2 10 N NaOH (mL) | Temp. ° C./Time, hr.[b] | Step 3 Washing, pH adjustment, and Drying[h] | Yield (g)[g] | Phosphorous Cap. (mg P/g ZO) | Density (g/mL) |
|---|---|---|---|---|---|---|---|---|---|---|---|
| ZO-B1[c] | 32.335 (100) | 33 | 165 | 5/1 | Reflux/1 | 43.2 (5 N) | Reflux/1.5 | E-B80 | 13.2[d] | >29.3 | 0.677 |
| ZO-B2 | 64.45 (200) | 35 | 175 | 5/1 | Reflux/1.25 | 43.2 | Reflux/3 | E-B80 | 11.0[e] | >28.7 | 0.558 |
|  |  |  |  |  |  |  |  | W-B110 | 10.6 | 23.6 | 1.180 |
| ZO-B3 | 64.45 (200) | 35 | 175 | 5/1 | Reflux/2 | 43.2 | Reflux/3 | E-B80 | 11.0[e] | >28.5 | 0.771 |
|  |  |  |  |  |  |  |  | W-B110 | 10.7 | 19 | 1.162 |
| ZO-B4[c] | 64.45 (200) | 45 | 175 | 3.89/1 | Reflux/1.25 | 43.2 | Reflux/3 | E-B80 | 11.3[e] | 40.4 | 0.647 |
|  |  |  |  |  |  |  |  | W-B110 | 11.3[e] | 18.8 | 1.114 |
| ZO-B5 | 64.45 (200) | 35 | 140 | 4/1 | Reflux/2 | 43.2 | Reflux/3 | E | 12.0 | >29.4 | 0.798 |
|  |  |  |  |  |  |  |  | W | 11.2 | 19.7 | 1.169 |
| ZO-B6 | 64.45 (200) | 35 | 105 | 3/1 | Reflux/2 | 43.2 | Reflux/3 | E | 8.6 | 41.7 | 0.554 |
|  |  |  |  |  |  |  |  | W | 7.8 | 24.8 | 0.959 |
| ZO-B7 | 64.45 (200) | 35 | 140 | 4/1 | Reflux/4 | 43.2 | Reflux/3 | E-B60 | 10.7 | >27.6 | 1.011 |
|  |  |  |  |  |  |  |  | W-B110 | 9.1 | 17.3 | 1.153 |
| ZO-B8 | 64.45 (200) | 35 | 140 | 4/1 | Reflux/2 | 43.2 | Reflux/20 | E-B60 | 11.5 | >28.1 | 0.934 |
|  |  |  |  |  |  |  |  | W-B110 | 9.8 | 23.3 | 1.122 |
| ZO-B9 | 64.45 (200) | 35 | 140 | 4/1 | Reflux/2.2 | 43.2 | Reflux/3 | E-B60 | 10.7 | >30.1 | 0.720 |
|  |  |  |  |  |  |  |  | W-B110 | 10.1 | 23.4 | 1.096 |
| ZO-B10 | 64.45 (200) | 35 | 140 | 4/1 | Reflux/6 | 43.2 | Reflux/17 | E-B60 | 8.6 | 31.9 | 0.577 |
|  |  |  |  |  |  |  |  | W-B110 | 8.3 | 26.0 | 1.068 |
| ZO-B11 | 128.9 (400) | 70 | 280 | 4/1 | Reflux/2 | 86.4 | Reflux/20 | W-B110 | 11.5 | 26.9 | 1.045 |
|  |  |  |  |  |  |  |  | W-B80 | 11.9 | 22.3 | 1.054 |
|  |  |  |  |  |  |  |  | W-N110 | 10.6 | 26.2 | 1.054 |
|  |  |  |  |  |  |  |  | E-N80 | 11.1 | 38.7 | 0.553 |
| ZO-B12 | 128.9 (400) | 70 | 280 | 4/1 | Reflux/2 | 86.4 | Reflux/20 | W-N25 | 13.7 | 26.8 | 1.147 |
|  |  |  |  |  |  |  |  | W-N60 | 11.6 | 28.1 | 1.037 |
|  |  |  |  |  |  |  |  | W-N80 | 12.1 | 28.7 | 1.006 |
|  |  |  |  |  |  |  |  | W-N110 | 11.0 | 28.7 | 0.965 |
| ZO-B13 | 128.9 (400) | 70 | 210 | 3/1 | Reflux/2 | 86.4 | Reflux/20 | W-N25 | 14.1 | 27.5 | 1.167 |
|  |  |  |  |  |  |  |  | W-N60 | 12.0 | 28.5 | 1.017 |
|  |  |  |  |  |  |  |  | W-N80 | 12.2 | 28.5 | 0.965 |
|  |  |  |  |  |  |  |  | W-N110 | 11.0 | 29.0 | 0.983 |

TABLE II-continued

METHOD II[a]

| ZO Product | ZrOCl$_2$ g (mmol) | Step 1 | | | | Step 2 | | Step 3 | | | |
|---|---|---|---|---|---|---|---|---|---|---|---|
| | | Water (mL) | IPA (mL) | IPA/ Water (v/v) | Temp./ Time, hr. | 10 N NaOH (mL) | Temp. °C./Time, hr.[b] | Washing, pH adjustment, and Drying[h] | Yield (g)[g] | Phosphorous Cap. (mg P/g ZO) | Density (g/mL) |
| ZO-B14 | 128.9 (400) | 70 | 140 | 2/1 | Reflux/2 | 86.4 | Reflux/20 | W-N25 | 11.8 | 27.6 | 0.834 |
| | | | | | | | | W-N60 | 10.4 | 27.6 | 0.786 |
| | | | | | | | | W-N80 | 10.2 | 29.4 | 0.744 |
| | | | | | | | | W-N110 | 9.9 | 27.6 | 0.766 |
| ZO-B15 | 3.2 kg (10 mol) | 1.75 L | 5.25 L | 3/1 | Reflux/2 | 2.16 L | Reflux/20 | W-N110 | 902 | 27.5 | 0.952 |

[a]Step 1: isopropanol (IPA) was added to a solution of zirconyl chloride in water and the resulting solution was heated to reflux to give precipitate. Step 2: 10 N NaOH was added and heating to reflux continued.
[b]After refluxing the mixture was stirred at RT overnight.
[c]Hydroxypropyl cellulose (1 mg/mL) was included in the reaction mixture (Step 1).
[d]Fines were not removed during washing.
[e]Fines were removed during washing by decantation of the supernatant.
[f]Supernatant was replaced by IPA and 10 N NaOH was added before heating to reflux.
[g]Yield of product from zirconyl chloride.
[h]Nomenclature: E: Product was washed with ethanol; W: Product was washed with water; E-B: Product was washed with water, followed by ethanol (E), no pH adjustment (B), and dried at 80° C. (80) or 110° C.(110); W-B: Product was washed with water (W), no pH adjustment (B) and dried at 80° C. (80) or 110° C. (110); and W-N: Product was washed with water (W), pH was adjusted to 7.0(N), and dried to 25° C. (25), 60° C. (60), 80° C. (80) or 110° C. (110).

In general, the zirconium oxide compositions produced by Method II had a higher density than the zirconium oxide compositions produced by Method I. The density of the ethanol washed zirconium oxide (0.5–0.9 g/mL) was lower than the density of the water washed zirconium oxide (1.6–1.1 g/mL). This indicates that ethanol washed zirconium oxide is more porous than the water washed zirconium oxide, and as a consequence, it has a higher phosphorous sorption capacity (e.g., about 30 to about 40 mg/g for ethanol washed zirconium oxide as compared to about 20 to about 30 mg/g for water washed zirconium oxide).

In general, the density of zirconium oxide decreases with a decreasing isopropanol/water ratio, particularly with respect to the zirconium oxide compositions made according to Method I procedures. With respect to Method II procedures, a decrease in density was observed when the isopropanol/water ratio of 2/1 was used. The capacity tests also indicated that longer refluxing times (e.g., about 20 hours) for the hydrolysis are preferred. In this regard, a higher phosphorous sorption capacity was consistently obtained as shown in Tables I and II.

Methods I and II produced zirconium oxide compositions that were white in color and that had a large particle size in powder form. This allowed the compositions to be easily washed with water/ethanol by redispersion and decantation methods, thus facilitating the large-scale synthesis of zirconium oxide. Further, acceptable column backpressure levels were observed during the dynamic capacity test.

The test results also demonstrated that an effective sorption capacity can be achieved with a large-scale synthesis of zirconium oxide compositions made pursuant to an embodiment of the present invention. The reaction parameters for large-scale synthesis were based on the following factors: a) designing a relatively simple process for zirconium oxide synthesis; b) obtaining a large particle size at desirable levels of product yields; c) obtaining a desirable level of phosphorous sorption capacity, such as within or exceeding a phosphorous sorption capacity that ranges from about 27 to about 29 mg of phosphorous/g of zirconium oxide; and d) obtaining a desirable level of product density, such as within or exceeding a density that ranges from about 0.9 g/mL to about 1.1 g/mL.

The zirconium oxide compositions made pursuant to an embodiment of the present invention can effectively remove via sorption any suitable number, type and amount of constituents from a fluid, particularly phosphorous-containing constituents including anions, molecules, radicals and the like. It should be appreciated that the zirconium oxide compositions of the present invention can remove constituents from any suitable fluid existing in liquid phase, gaseous phase, mixed liquid and gaseous phase, supercritical systems and/or the like.

The sorption properties make the zirconium oxide compositions of the present invention well suited for a variety of different applications subject to physiological and/or non-physiological conditions. In an embodiment, the zirconium oxide compositions of the present invention can be used to remove phosphorous-containing constituents or the like from blood and/or solutions used to dialyze blood. In this regard, the present invention provides materials, devices, apparatuses and systems that can utilize zirconium oxides compositions made pursuant to an embodiment of the present invention to remove constituents from fluids, such as phosphorous-containing constituents from blood and/or solutions used to dialyze blood as previously discussed.

Figure 1:
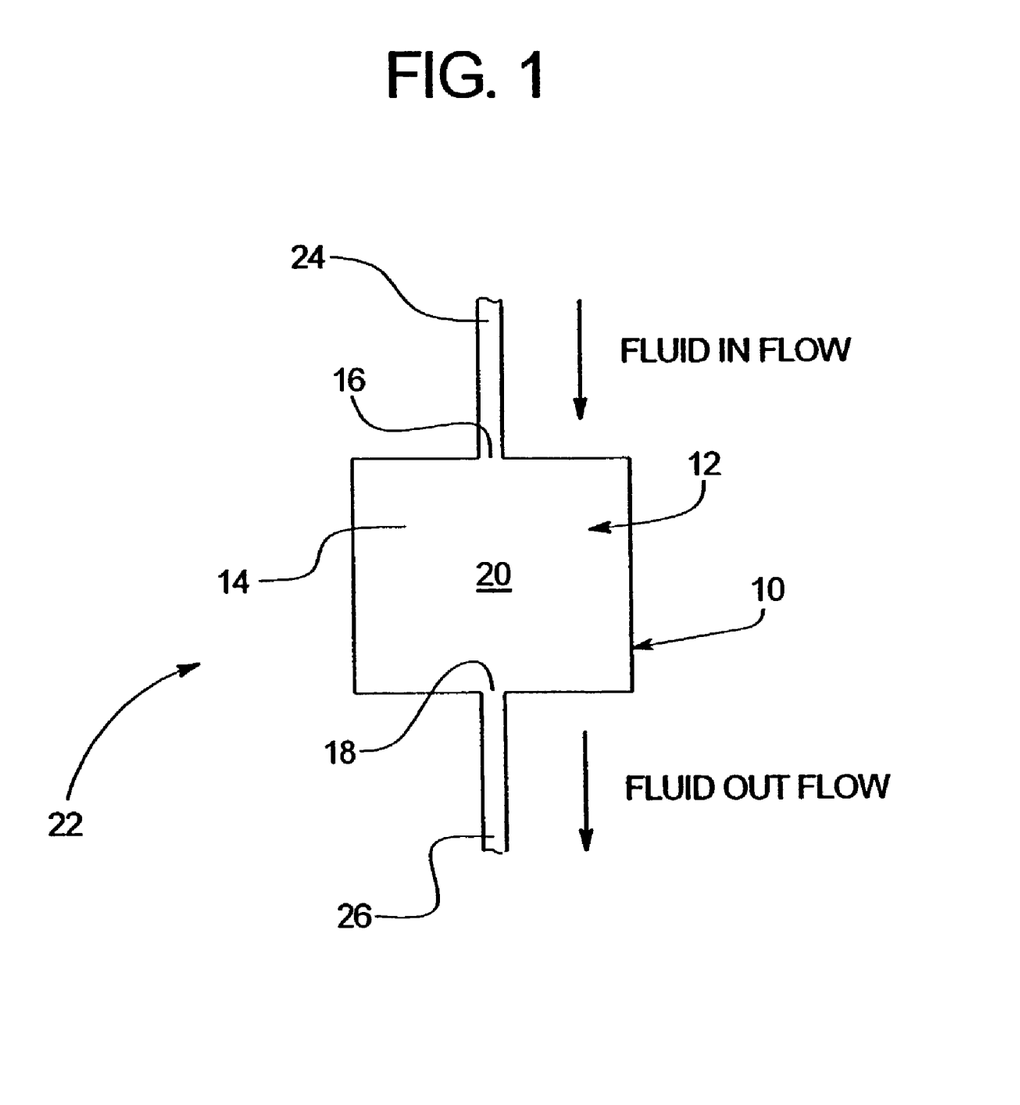
FIG. 1 is a schematic illustration of a system including a device containing a zirconium oxide composition according to an embodiment of the present invention.

In an embodiment, the present invention includes devices that utilize the zirconium oxide compositions made pursuant to an embodiment of the present invention to remove phosphorous-containing constituents or the like from fluids. In general, the device 10 includes a body 12 defining an interior 14 through which a fluid can pass into the device 10 via an inlet 16 and optionally flow out of the device via an outlet 18 as shown in FIG. 1. The device 10 contains the zirconium oxide composition or material thereof 20 made according to an embodiment of the present invention in its interior 14. The device 10 can contain the zirconium oxide material in any suitable way, such as in a layered configuration. As the fluid passes through the device, the zirconium oxide composition can act to remove phosphorous-containing constituents or the like from the fluid.

As previously discussed, the present invention provides a system capable of removing a constituent from a fluid. The system can be applied in a variety of different applications including, for example, therapeutic and diagnostic applications. In an embodiment, the system 22 includes a fluid pathway through which the fluid can flow that is coupled to the device 10 as discussed above and as shown in FIG. 1. The fluid pathway at least includes an inflow fluid path 24 allowing fluid to enter the device. Optionally, a number of other suitable fluid pathways can be coupled to the device, such as an outflow fluid path 26 allowing the fluid to pass through and out of the device 10.

As applied, the device is particularly suited for removal of phosphorous-containing constituents from a dialysis solution during dialysis therapy. In an embodiment, the device includes a chemical cartridge coupled in any suitable manner to a patient loop (not shown) through which dialysate is circulated into, through and out of the patient during dialysis therapy, such as continuous flow peritoneal dialysis. In this regard, the device can be used to remove a therapeutically effective amount of a phosphorous-containing constituent from the dialysis solution as it continually or intermittently passes through the device prior to circulation into, through and out of the patient. This can enhance dialysis clearance and minimize the amount of dialysis fluid necessary to maintain effective clearance levels during dialysis therapy.

It should be appreciated that the chemical cartridge can include any suitable number, type and amount of materials in addition to the zirconium oxide compositions made pursuant to an embodiment of the present invention in order to enhance treatment. An example of a chemical cartridge according to an embodiment of the present invention is disclosed in U.S. patent application Ser. No. 09/990,673, filed on Nov. 13, 2001, and entitled "Method and Compositions for Removing Uremic Toxins in Dialysis Processes," the disclosure of which is incorporated herein by reference.

Figure 2:
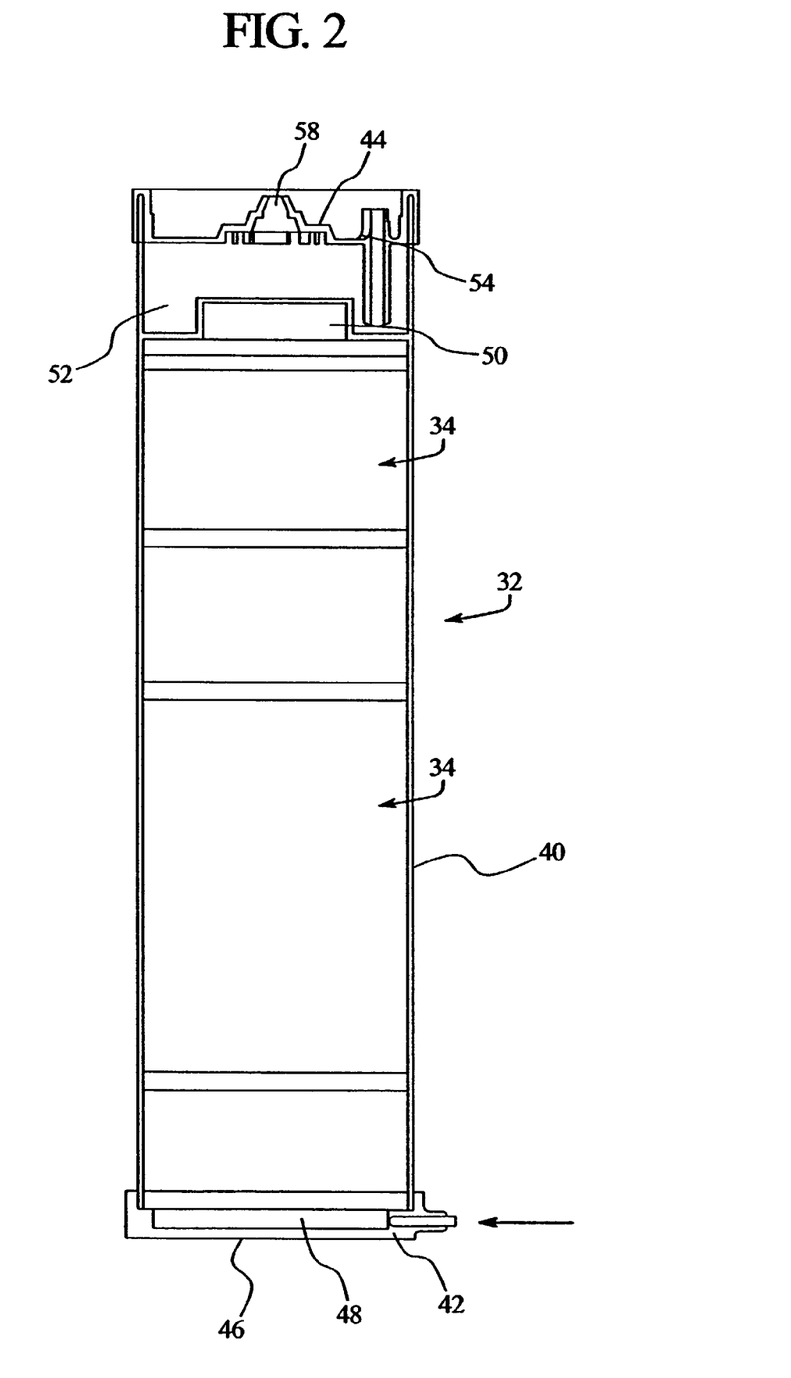
FIG. 2 is a schematic illustration of a chemical cartridge that at least includes a zirconium oxide composition made pursuant to an embodiment of the present invention.

Referring now to FIG. 2, a cross-sectional view of an embodiment of the cartridge 32 of the present invention is illustrated. The cartridge 32 includes a resin bed 34 that is designed to modify the chemistry of the recirculating dialysate and remove uremic toxins. At the same time, pursuant to the present invention, the cartridge 32 maintains electrolyte concentrations and the solution pH of the dialysate at physiologic levels.

The cartridge 32 generally comprises: a main body 40, an inlet cap 42, the resin bed 34, and an outlet cap 44. In the embodiment illustrated, fluid is routed into the cartridge 32 through the inlet cap 42 that is located at a bottom 46 of the cartridge 32. In the embodiment illustrated, a small open header chamber 48 prior to the resin bed 34 is used to distribute the flow of fluid evenly across the cross-section of the cartridge 32 and thereby the resin bed 34. The fluid preferably flows upwardly through the resin bed 34.

In the embodiment illustrated, downstream of the final section of the resin bed 34 there is located another open header chamber 50. The second open header chamber 50 is located before a gas separation chamber 52. The second header chamber 50 is used to maintain an even fluid velocity distribution throughout the resin bed 34.

The liquid level in the gas separation chamber 52 is maintained within a specified range to provide an air space above the liquid in the cartridge 32. Gases that are produced during therapy, e.g., carbon dioxide, are vented from the cartridge 32 to the environment through a passage 54 on the outlet cap 44. If desired, this passage 54 may include a filter member. A submerged, or partially submerged, barrier in the gas separation chamber 52 produces a flow pattern that restricts gases from being drawn to the liquid outlet.

At the outlet cap 44 of the cartridge 32 the liquid outlet port 58 is located. The liquid outlet 58 port removes liquid from the chamber of the cartridge 32 through the outlet cap 44 using a siphon action. If desired, an additional port may be used to add a chemical concentrate to the volume of liquid in the gas separation chamber to reconstitute the chemical composition of the fluid outflow.

In an embodiment, the interior of the cartridge 32 has a rough surface. The rough surface is designed so that it prevents fluid from flowing along the sides of the exterior by passing the resin bed 34.

The resin bed 34, in part, functions to remove waste. In this regard, generally waste is removed using a two-step process. The steps include an enzymatic conversion of urea using urease followed by subsequent removal of the conversion byproducts. In the enzymatic reaction, one mole of urea is decomposed into two moles of ammonia and one mole of carbon dioxide. Ammonia ($NH_3$) is primarily (>95%) present as ammonium ion ($NH_4^+$), since its pKa of 9.3 is substantially greater than the solution pH. The carbon dioxide that is formed can either be present as dissolved carbon dioxide or as bicarbonate ion, depending on the solution pH. Since the pKa for this equilibrium is 6.1, both species may be present in substantial quantities under conditions of use. In addition, if the solution is in communication with a gas phase, the dissolved carbon dioxide is in equilibrium with the carbon dioxide present in the gas phase.

The resin bed includes at least four layers, although more layers can be used. Generally, the layers of the resin bed comprise at least: a urease layer; a layer of zirconium phosphate; a layer of zirconium oxide; and a layer of carbon.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of producing a zirconium oxide composition, the method comprising the steps of:
   preparing a reaction solution including a base solution and a zirconyl salt solution including a zirconyl salt in isopropanol and water;
   mixing the reaction solution;
   heating the reaction solution at a reflux temperature;
   forming a zirconium oxide precipitate;
   and washing and drying the zirconium oxide precipitate.

2. The method of claim 1 herein the zirconyl salt comprises a zirconyl chloride octahydrate.

3. The method of claim 1 herein the base solution includes a base material selected from the group consisting of sodium hydroxide, ammonium hydroxide and combinations thereof.

4. The method of claim 1 herein a volume ratio of isopropanol to water in the zirconyl salt solution ranges from about 5:1 to about 2:1.

5. The method of claim 1 herein the reaction solution is mixed at room temperature.

6. The method of claim 5 herein the reaction solution is mixed for about 2 hours to about 20 hours.

7. The method of claim 1 herein the reaction solution is maintained at the reflux temperature for about 2 hours to about 20 hours.

8. The method of claim 1 herein the zirconium oxide precipitate is washed in a solvent selected from the group consisting of ethanol, water and combinations thereof.

9. The method of claim 1 herein the zirconium oxide precipitate has a particle size greater than about 10 microns.

10. A method of producing a zirconium oxide composition, the method comprising the steps of:
preparing a zirconyl salt solution including a zirconyl salt in isopropanol and water;
heating the zirconyl salt solution at a reflux temperature;
adding a base solution to the zirconyl salt solution at the reflux temperature;
forming a zirconium oxide precipitate;
and washing and drying the zirconium oxide precipitate.

11. The method of claim 10 herein the zirconyl salt comprises zirconyl chloride octahydrate.

12. The method of claim 10 herein a volume ratio of isopropanol to water ranges from about 5:1 to about 2:1.

13. The method of claim 10 herein the zirconyl salt solution is heated at the reflux temperature for about 1 hour to about 6 hours.

14. The method of claim 10 herein the zirconyl salt solution is maintained at the reflux temperature for about 1.5 hours to about 20 hours subsequent to addition of the base solution.

15. The method of claim 14 herein the base solution includes a base material selected from the group consisting of sodium hydroxide, ammonium hydroxide and combinations thereof.

16. The method of claim 10 herein the zirconium oxide precipitate is washed in a solvent selected from the group consisting of water, ethanol and combinations thereof.

17. The method of claim 10 herein the zirconium oxide precipitate has a particle size greater than about 10 microns.

18. A method of increasing sorption capacity of a zirconium oxide composition in crystalline form, the method comprising the steps of:
mixing at least a base solution and a zirconyl salt solution including a zirconyl salt in isopropanol and water thereby forming a reaction solution;
heating the mixed solution at a reflux temperature;
forming a zirconium oxide precipitate having a sorntion capacity for a phosphorous-containing constituent of greater than about 20 mg of phosphorous per gram of the zirconium oxide composition; and washing and drying the zirconium oxide precipitate.

19. The method of claim 18 herein the zirconyl salt comprises a zirconyl chloride octahydrate.

20. The method of claim 18 herein the base solution includes a base material selected from the group consisting of sodium hydroxide, ammonium hydroxide and combinations thereof.

21. The method of claim 18 herein a volume ratio of isopropanol to water in the zirconyl salt solution ranges from about 5:1 to about 2:1.

22. The method of claim 18 herein the reaction solution is mixed at room temperature.

23. The method of claim 18 herein the reaction solution is maintained at the reflux temperature for about 2 hours to about 20 hours.

24. The method of claim 18 herein the zirconium oxide precipitate is washed in a solvent selected from the group consisting of ethanol, water and combinations thereof.

25. A method for increasing sorption capacity of a zirconium oxide composition in a crystalline form, the method comprising the steps of:
preparing a zirconyl salt solution including a zirconyl salt in isopropanol and water;
heating the zirconyl salt solution at a reflux temperature;
adding a base solution to the zirconyl salt solution at the reflux temperature;
forming a zirconium oxide precipitate having a sorption capacity for a phosphorous-containing constituent of greater than about 20 mg of phosphorous per gram of the zirconium oxide composition; and
washing and drying the zirconium oxide precipitate.

26. The method of claim 25 herein the zirconyl salt comprises a zirconyl chloride octahydrate.

27. The method of claim 25 herein a volume ratio of isopropanol to water ranges from about 5:1 to about 2:1.

28. The method of claim 25 herein the zirconyl salt solution is heated at the reflux temperature for about 1 to about 6 hours.

29. The method of claim 28 herein the zirconyl salt solution is maintained at the reflux temperature for about 1.5 hours to about 20 hours subsequent to addition of the base solution.

30. The method of claim 25 herein the zirconium oxide precipitate is washed in a solvent selected from the group consisting of water, ethanol and combinations thereof.

* * * * *